United States Patent
Sadakata et al.

(10) Patent No.: US 9,831,712 B2
(45) Date of Patent: Nov. 28, 2017

(54) NON-CONTACT CHARGING DEVICE AND NON-CONTACT CHARGING METHOD

(71) Applicant: PANASONIC INTELLECTUAL PROPERTY MANAGEMENT CO., LTD., Osaka (JP)

(72) Inventors: Hideki Sadakata, Shiga (JP); Atsushi Fujita, Shiga (JP); Yoshiharu Omori, Shiga (JP); Daisuke Bessyo, Saitama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 229 days.

(21) Appl. No.: 14/831,834

(22) Filed: Aug. 20, 2015

(65) Prior Publication Data

US 2015/0357863 A1 Dec. 10, 2015

Related U.S. Application Data

(63) Continuation of application No. PCT/JP2014/000826, filed on Feb. 18, 2014.

(30) Foreign Application Priority Data

Feb. 20, 2013 (JP) .................................. 2013-030708

(51) Int. Cl.
*H02J 7/00* (2006.01)
*H02J 7/02* (2016.01)
*H02J 5/00* (2016.01)

(52) U.S. Cl.
CPC ............. *H02J 7/025* (2013.01); *H02J 5/005* (2013.01); *H02J 7/0052* (2013.01); *H02J 2007/0059* (2013.01)

(58) Field of Classification Search
USPC ........................................................ 320/108
See application file for complete search history.

(56) References Cited

U.S. PATENT DOCUMENTS 6,301,128 B1 * 10/2001 Jang ..................... H02J 5/005
363/127
2002/0067140 A1 * 6/2002 Qian .................... H05B 41/282
315/224

(Continued)

FOREIGN PATENT DOCUMENTS

CN 101316053 A 12/2008
JP 2006-074848 A 3/2006

(Continued)

OTHER PUBLICATIONS

Machine translation of JP2006-074848.*

(Continued)

*Primary Examiner* — Samuel Berhanu
(74) *Attorney, Agent, or Firm* — McDermott Will & Emery LLP

(57) ABSTRACT

A non-contact charger aims to control transmitted power efficiently. The non-contact charger includes a transmitting coil, an inverter circuit, a receiving coil, and a transmitted power control circuit. The inverter circuit outputs the transmitted power to the transmitting coil. The receiving coil receives power as received power from the transmitting coil. The transmitted power control circuit drives the inverter circuit at a frequency higher than maximum received power frequencies at which the received power has one or two maximum values.

9 Claims, 10 Drawing Sheets

(56) References Cited

U.S. PATENT DOCUMENTS

| | | | | |
|---|---|---|---|---|
| 2007/0241619 A1* | 10/2007 | Hatano | ............ | H02M 3/33569 |
| | | | | 307/106 |
| 2013/0197734 A1* | 8/2013 | Okura | ................ | B60L 11/1822 |
| | | | | 701/22 |
| 2014/0152248 A1* | 6/2014 | Yeh | ........................ | H02J 7/025 |
| | | | | 320/108 |
| 2014/0238978 A1* | 8/2014 | Kitaizumi | ............ | H05B 6/1236 |
| | | | | 219/667 |
| 2016/0001662 A1* | 1/2016 | Miller | .................. | B60L 11/005 |
| | | | | 307/104 |

FOREIGN PATENT DOCUMENTS

| | | | |
|---|---|---|---|
| JP | 2008-236917 A | 10/2008 | |
| JP | 2010233354 A | 10/2010 | |
| JP | 2011-142769 A | 7/2011 | |
| WO | 2012093423 A1 | 7/2012 | |
| WO | 2013179763 A1 | 12/2013 | |

OTHER PUBLICATIONS

English translation of Chinese Search Report dated Mar. 22, 2017 issued in Chinese Patent Application No. 201480008184.4.
International Search Report and Written Opinion issued in corresponding International Patent Application No. PCT/JP2014/000826, dated Mar. 18, 2014; 6 pages with English translation of Search Report.
European Extended Search Report issued European Patent Application No. 14753744.3, dated Jan. 4, 2016.

* cited by examiner

CURRENT FLOWING THROUGH SWITCHING ELEMENT 19 AND DIODE 21 AS WELL AS SWITCHING ELEMENT 26 AND DIODE 27

CURRENT FLOWING THROUGH SWITCHING ELEMENT 20 AND DIODE 22 AS WELL AS SWITCHING ELEMENT 24 AND DIODE 25

VOLTAGE AT SWITCHING ELEMENTS 19 AND 26

GATE VOLTAGE AT SWITCHING ELEMENTS 19 AND 26

GATE VOLTAGE AT SWITCHING ELEMENTS 20 AND 24

CURRENT FLOWING THROUGH TRANSMITTING COIL 7

→ TIME

CURRENT FLOWING THROUGH SWITCHING ELEMENT 19 AND DIODE 21 AS WELL AS SWITCHING ELEMENT 26 AND DIODE 27

CURRENT FLOWING THROUGH SWITCHING ELEMENT 20 AND DIODE 22 AS WELL AS SWITCHING ELEMENT 24 AND DIODE 25

VOLTAGE AT SWITCHING ELEMENTS 19 AND 26

GATE VOLTAGE AT SWITCHING ELEMENTS 19 AND 26

GATE VOLTAGE AT SWITCHING ELEMENTS 20 AND 24

CURRENT FLOWING THROUGH TRANSMITTING COIL 7

→ TIME

FIG.11

| RECEIVER ID | VOLTAGE OF BATTERY | START-UP FREQUENCY |
|---|---|---|
| 1 | 100V(LOW) | fs1a |
| | ... | ... |
| | 500V(HIGH) | fs1b |
| 2 | 200V(LOW) | fs1a_2 |
| | ... | ... |
| | 600V(HIGH) | fs1b_2 |
| 3 | 100V(LOW) | fs1a_3 |
| | ... | ... |
| | 500V(HIGH) | fs1b_3 |

NON-CONTACT CHARGING DEVICE AND NON-CONTACT CHARGING METHOD

CROSS-REFERENCE TO RELATED APPLICATIONS

This is a continuation of International Application No. PCT/JP2014/000826 filed on Feb. 18, 2014, which claims priority to Japanese Patent Application No. 2013-030708 filed on Feb. 20, 2013. The entire disclosures of these applications are incorporated by reference herein.

BACKGROUND

The present disclosure relates to a non-contact charger and a non-contact charging method of charging secondary batteries mounted on, for example, an electric propulsion vehicle (e.g., an electric vehicle, and a hybrid vehicle) via a non-contact method.

Techniques utilizing magnetic fields, electric fields, radio waves, etc., are being developed to transmit power of a non-contact charger via a non-contact method. Such non-contact power transmitting techniques do not require any wires or connectors connecting a power supplier and a power receiver. This allows users to save trouble for connection. There is a lower risk of electric leakage or electric shock when it rains.

Such a non-contact charger includes an inverter circuit, from which a current of a predetermined frequency is supplied to a transmitting coil. The transmitting coil generates a magnetic flux.

As a non-contact power transmitting method utilizing magnetic resonance generated by combining transmitting and receiving coils, a suggested technique is to detect the maximum power frequency at which the receiving coil receives maximum power so that the frequency of the power transmitted by the transmitting coil is equal to the maximum power frequency (see, e.g., Japanese Unexamined Patent Publication No. 2011-142769).

SUMMARY

However, the present inventors found that loss at an inverter circuit increases to reduce efficiency in transmitting power in using the above-described conventional technique.

The present disclosure provides a non-contact charger and non-contact charging method, which efficiently control power to be transmitted.

In order to achieve this problem, a non-contact charger according to the present disclosure includes a transmitting coil; an inverter circuit outputting power to be transmitted to the transmitting coil; a receiving coil receiving the power as received power from the transmitting coil; and a transmitted power control circuit driving the inverter circuit at a frequency higher than maximum received power frequencies at which the received power has one or two maximum values.

A non-contact charging method according to the present disclosure includes outputting power to be transmitted from an inverter circuit to a transmitting coil; and driving the inverter circuit at a frequency higher than maximum received power frequencies at which received power has one or two maximum values.

The present disclosure allows for efficiently controlling power to be transmitted.

BRIEF DESCRIPTION OF THE DRAWINGS

FIG. 3A illustrates a case where an inverter power supplier has a lower voltage. FIG. 3B illustrates a case where the inverter power supplier has a higher voltage.

FIG. 6A illustrates a higher frequency characteristic. FIG. 6B illustrates a lower frequency characteristic.

FIG. 10A illustrates a case where an inverter power supplier has a lower voltage. FIG. 10B illustrates a case where the inverter power supplier has a higher voltage.

FIG. 11 illustrates an example of what is stored in a start-up frequency memory shown in FIG. 9.

DETAILED DESCRIPTION

Embodiments of the present disclosure will now be described with reference to the drawings. These embodiments are not intended to limit the scope of the present disclosure. Those skilled in the art would readily understand that those embodiments may also be expressed in a similar language or depicted similarly in the same or similar technical fields.

First, the relation between an inverter circuit and the maximum power frequency in a conventional technique will be described.

If the inverter circuit operates in synchronization with the maximum power frequency, a snubber connected in series or parallel to a semiconductor switch does not operate normally. For example, the energy stored in a transmitting coil when the semiconductor switch is turned off is too small to charge and discharge the snubber. This increases loss at the semiconductor switch. No snubber should be therefore connected in operation at the maximum power frequency.

If an inverter circuit starts at the maximum power frequency, a high surge voltage or current could be generated at the semiconductor switch in the inverter circuit in a transient state immediately after the start-up. This incurs the risk of breaking down the semiconductor switch. There is thus a need to start up the inverter circuit at a frequency different from the maximum power frequency.

However, if the inverter circuit operates at the frequency different from the maximum power frequency, a current flowing through a transmitting coil increases when the semiconductor switch is turned off. In particular, if there is no snubber, the loss at the semiconductor switch increases. As a result, the semiconductor switch could be broken down.

Furthermore, if the frequency of the power transmitted by the transmitting coil is synchronized with the maximum power frequency, the transmitted power becomes uncontrollable to overcharge a battery. Then, the battery could generate heat, smoke, or fire, that is, could be unsafe. In order to prevent such unsafe conditions, charging of a battery is stopped safely before the battery is fully charged. At this time, there is a practical problem that an electric propulsion vehicle has a reduced cruising distance.

The inventors of the present disclosure focused on the problem described above and invented a non-contact charger which efficiently controls power to be transmitted.

Figure 1:
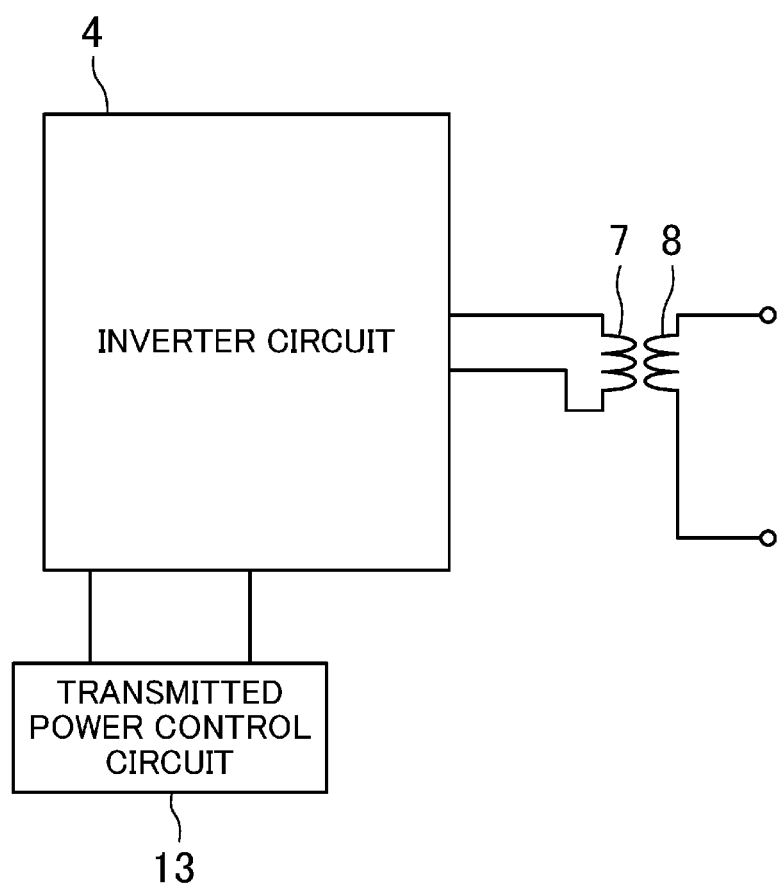
FIG. 1 is a block diagram illustrating a basic configuration of a non-contact charger according to the present disclosure.

FIG. 1 illustrates a basic configuration of a non-contact charger according to the present disclosure. The non-contact charger according to the present disclosure shown in FIG. 1 includes a transmitting coil 7, an inverter circuit 4, a receiving coil 8, and a transmitted power control circuit 13. The inverter circuit 4 outputs transmitted power to the transmitting coil 7. The receiving coil 8 receives power as received power from the transmitting coil 7. The transmitted power control circuit 13 drives the inverter circuit 4 at a frequency higher than the maximum received power frequencies, at which the power received from the transmitting coil 7 has one or two maximum values.

A non-contact charging method according to the present disclosure includes outputting power to be transmitted from the inverter circuit 4 to the transmitting coil 7, and driving the inverter circuit 4 at a frequency higher than the maximum received power frequencies, at which the received power has one or two maximum values.

The non-contact charger and non-contact charging method having these features efficiently control power to be transmitted.

First Embodiment

Figure 2:
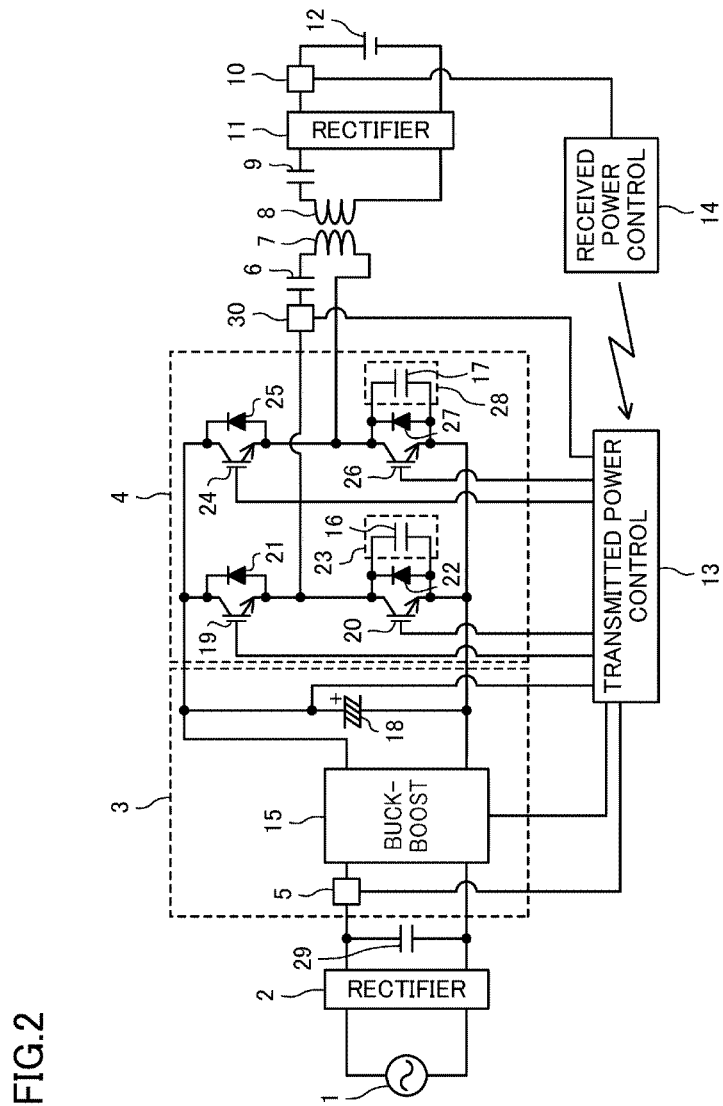
FIG. 2 is a circuit diagram of a non-contact charger according to a first embodiment of the present disclosure.

FIG. 2 is a circuit diagram of a non-contact charger according to a first embodiment of the present disclosure. This non-contact charger includes a power transmitter and a power receiver.

As shown in FIG. 2, the power transmitter includes a commercial power supply 1, a rectifier circuit 2, a capacitor 29, an input power detector 5, a buck-boost converter 15, an inverter power supply 18, an inverter circuit 4, a first resonance capacitor 6, a transmitting coil 7, a transmitted power detector 30, and a transmitted power control circuit 13. The rectifier circuit 2 rectifies a voltage or current output from the commercial power supply 1. The capacitor 29 is connected to the output terminal of the rectifier circuit 2. The buck-boost converter 15 increase or decrease the voltage output from the rectifier circuit 2, and outputs the increased or decreased voltage to the inverter power supply 18. The inverter circuit 4 is connected to the inverter power supply 18. The first resonance capacitor 6 is connected to the output terminal of the inverter circuit 4.

The input power detector 5, the buck-boost converter 15, and the inverter power supply 18 form a power supply circuit 3 controlled by the transmitted power control circuit 13.

The inverter circuit 4 includes semiconductor switches (on/off switching elements) 19, 20, 24, and 26, diodes 21, 22, 25, and 27, and snubber circuits 23 and 28. The diodes 21, 22, 25, and 27 are connected in antiparallel to the semiconductor switches. The snubber circuits 23 and 28 include snubber capacitors 16 and 17, which are connected in parallel to the semiconductor switches.

The power receiver includes a receiving coil 8, a second resonance capacitor 9, a rectifier circuit 11, a received power detector 10, a battery 12 to be charged, and a received power control circuit 14. The receiving coil 8 receives the power transmitted from the transmitting coil 7.

Figure 3A:
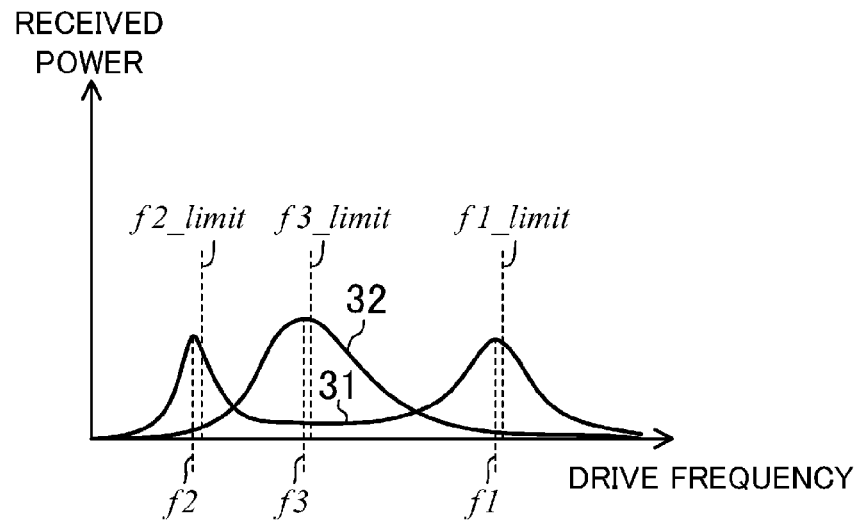
FIGS. 3A and 3B illustrate the frequency characteristic of the power received by the non-contact charger shown in FIG. 2.
Figure 3B:
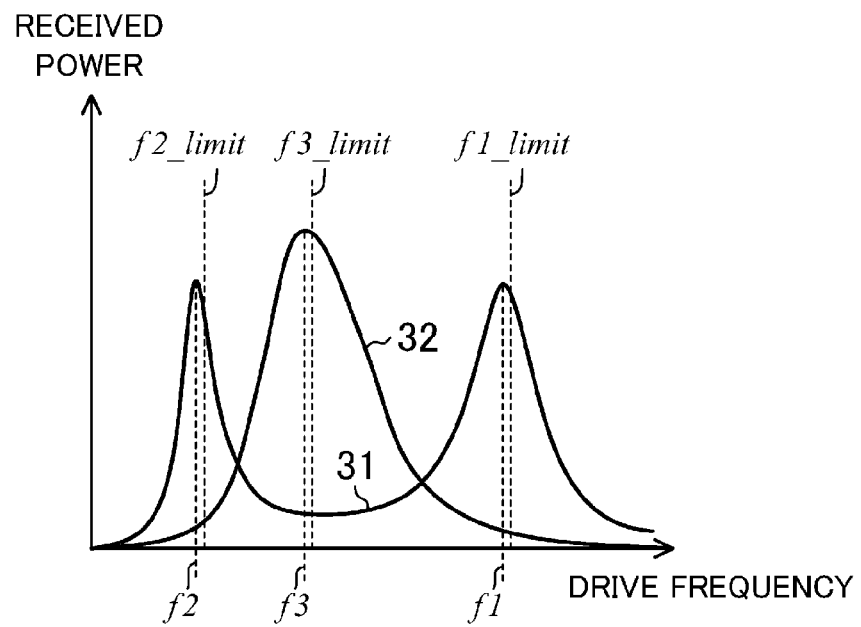

FIGS. 3A and 3B illustrate the frequency characteristic of the power received by the non-contact charger. FIG. 3A illustrates the frequency characteristic of the received power in a case where the inverter power supply 18 has a lower voltage. FIG. 3B illustrates the frequency characteristic of the received power in a case where the inverter power supply 18 has a higher voltage.

As shown in FIGS. 3A and 3B, in this embodiment, a frequency characteristic 32 has the maximum received power frequency, at which the received power has one maximum value (i.e., f3 in the figures). A frequency characteristic 31 has two maximum received power frequencies (i.e., f1 and f2 in the figures). These frequency characteristics change depending on the air gap between transmitting and receiving coils 7 and 8, the voltage of a battery, or other factors.

Next, operation of the blocks in the non-contact charger will be described.

For example, when an electric propulsion vehicle moves, the receiving coil 8 attached to the electric propulsion vehicle substantially faces the transmitting coil 7. Then, the received power control circuit 14 transmits the information need for charging (e.g., the power required for charging, the voltage of the battery) to the transmitted power control circuit 13. Upon receipt of the information needed for charging, the transmitted power control circuit 13 drives the buck-boost converter 15 and the inverter circuit 4 (starts up the buck-boost converter 15 prior to the inverter circuit 4) to transmit the power required for charging. That is, the transmitted power control circuit 13 drives the inverter circuit 4 at the lower limit drive frequency, and increases and decreases the voltage output from the buck-boost converter 15 to control the power to be transmitted.

The buck-boost converter 15 steps up or down the voltage output from the rectifier circuit 2, and outputs the voltage to the inverter power supply 18. In a step of controlling startup at the start of charging, the buck-boost converter 15 outputs a voltage lower than the voltage output from the commercial power supply 1 to the inverter power supply 18 to set the inverter circuit 4 to transmit sufficiently low power at the startup. That is, the voltage at the inverter power supply 18 is set to be lower than the voltage output from the commercial power supply 1. Specifically, the power to be transmitted is suitably adjusted to be equal to or lower than about 100 W.

In a step of controlling the inverter, the inverter circuit 4 starts at a frequency higher than the maximum received power frequencies, and reduces a drive frequency to the lower limit drive frequency based on a predetermined period and the amount of control. That is, the transmitted power control circuit 13 reduces the drive frequency of the inverter circuit 4 to the lower limit drive frequency based on the predetermined period and the amount of control, when the voltage at the inverter power supply 18 is lower than the voltage output from the commercial power supply 1.

For example, in FIGS. 3A and 3B, the drive frequency is reduced to f1_limit with respect to the maximum frequency f1, to f2_limit with respect to the maximum frequency f2, and to f3_limit with respect to the maximum frequency f3. As shown in FIGS. 3A and 3B, the drive frequency may have any value within a variable range equal to or higher than f1_limit in the operation at f1_limit, within a variable range from f2_limit to f3, and within a variable range equal to or higher than f3_limit in the operation at f3_limit.

In this embodiment, an example will be described where the non-contact charger operates at f1_limit.

When the drive frequency reaches f1_limit, the process proceeds to a step of controlling the buck-boost converter. The transmitted power control circuit 13 gradually increases the voltage at the inverter power supply 18 based on the predetermined period and the amount of control. The transmitted power control circuit 13 controls the buck-boost converter 15 so that a result of detection by the received power detector 10 is equal to the power required for charging. As describe above, FIG. 3A illustrates the frequency characteristic of the power received where the inverter power supply 18 has a lower voltage. FIG. 3B illustrates the frequency characteristic of the power received where the inverter power supply 18 has a higher voltage.

Next, operation of the non-contact charger after the received power has reached the power required for charging will be described.

If charging continues, the voltage of the battery rises and the line 31 shown in FIGS. 3A and 3B changes to the line 32, thereby also changing the lower limit drive frequency from f1_limit to f3_limit. The transmitted power control circuit 13 controls the buck-boost converter 15 to follow the lower limit drive frequency in accordance with the information (e.g., the voltage of the battery, the power required for charging, and the received power) transmitted from the received power control circuit 14. Specifically, when the voltage of the battery increases, the drive frequency is set to be low based on the predetermined period and the amount of control to be equal to the decreasing lower limit drive frequency.

Being charged with overpower, the battery 12 usually becomes unsafe, for example, the battery 12 could be ruptured by abnormal heating. Thus, in the non-contact charger according to the present disclosure, in the operation at f1_limit, the maximum received power frequency gradually shifts from f1 to f3 as the charge progresses. That is, the maximum received power frequency gradually decreases as the charge progresses. Thus, the drive frequency of the inverter circuit 4 is controlled to follow the shifted maximum received power frequency, thereby avoiding the risk of charging with overpower. The transmitted power control circuit 13 controls the drive frequency of the inverter circuit 4 such that the decreased received power is the power required for charging.

Instead of the operation at f1_limit, operation at f2_limit also provides efficient non-contact charging, which is an advantage of the present disclosure.

In this embodiment, an example has been described where one maximum received power frequency is seen as shown in FIGS. 3A and 3B, as the charging progresses. Two maximum received power frequencies may be seen even immediately before full charge depending on the characteristics of the battery and/or the air gap. In such a case, as well, the same or similar advantages as in the present disclosure are available.

As in the transmitted power control circuit 13 according to the present disclosure, the inverter circuit 4 operates at the lower limit drive frequency, and controls the power to be transmitted using the buck-boost converter 15 to control the power to be transmitted efficiently.

In short, the transmitted power control circuit 13 drives the inverter circuit 4 at the lower limit drive frequency, when the semiconductor switches are turned off. At this lower limit drive frequency, the snubber capacitors are charged to have a voltage equal to the voltage at the inverter power supply 18 or discharged to have a voltage of zero.

The configuration and operation of the inverter circuit 4 will now be described in detail to describe the lower limit drive frequencies f1_limit to f3_limit more specifically.

As shown in FIG. 2, input terminals of the inverter circuit 4 are connected to both the terminals of the inverter power supply 18. Both the terminals of the inverter power supply 18 are connected to a series connection body of the switching elements 19 and 20. The diodes 21 and 22 are connected in antiparallel to the switching elements 19 and 20, respectively. That is, the high-potential terminal (collector) of each switching element is connected to the cathode terminal of its associated diode.

The snubber circuit 23 including the snubber capacitor 16 is connected in parallel to the switching element 20 (or 19). Furthermore, a series connection body of the first resonance capacitor 6, the transmitting coil 7, and the transmitted power detector 30 are connected between the high potential terminals of the switching elements 20 and 26.

Figure 4A:
FIGS. 4A-4F illustrate operation waveforms of an inverter circuit shown in FIG. 2 in normal operation.
Figure 4B:
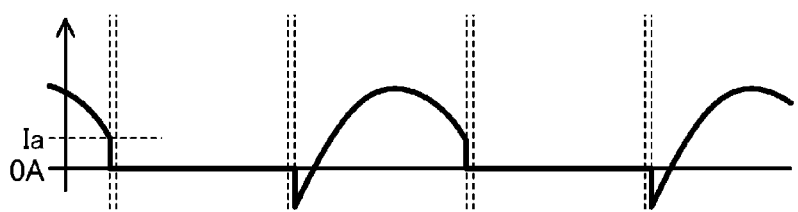
Figure 4C:
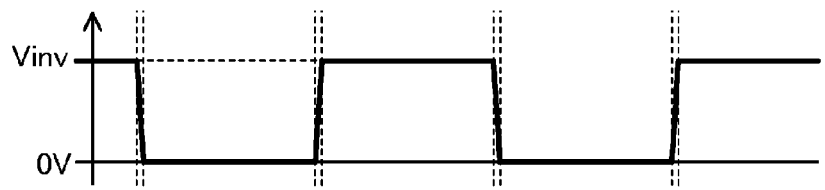
Figure 4D:
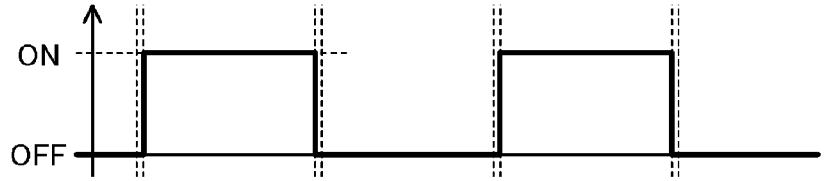
Figure 4E:
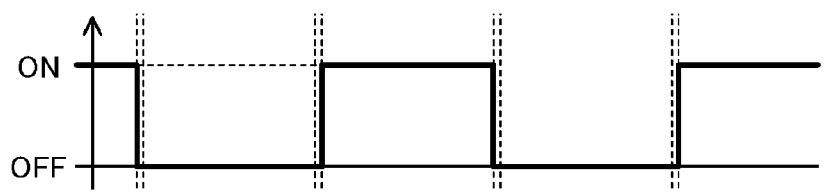
Figure 4F:
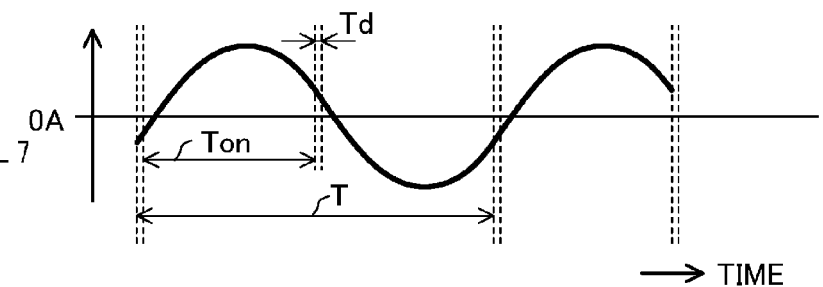

FIGS. 4A-4F illustrate operation waveforms of the inverter circuit 4 in normal operation. Gate voltages in the waveforms shown in FIGS. 4D and 4E are applied to the switching elements 19 and 20, respectively, to turn on/off the switching elements 19 and 20. Then, an AC current shown in FIG. 4F is generated at the first resonance capacitor 6 and the transmitting coil 7.

When the switching element 19 is turned off, the snubber capacitor 16 is discharged with a gentle slope generated by resonance among the transmitting coil 7, the first resonance capacitor 6, and the snubber capacitor 16. Thus, the switching element 19 performs zero voltage switching (ZVS) turn-off.

Once the snubber capacitor 16 is fully discharged, the diode 22 is turned on. While the diode 22 is on, an on-signal is applied to the gate of the switching element 20. In holding this state, the direction of a resonance current of the transmitting coil 7 is reversed and the diode 22 is turned off such that a current flows to the switching element 20. Then, the switching element 20 performs ZVS and zero current switching (ZCS) turn-on.

On the other hand, when the switching element 20 is turned off, the snubber capacitor 16 is charged with a gentle slope generated by resonance among the transmitting coil 7, the first resonance capacitor 6, and the snubber capacitor 16. Thus, the switching element 20 performs ZVS turn-off.

Once the snubber capacitor 16 is charged to have a voltage equal to the voltage at the inverter power supply 18, the diode 21 is turned on. While the diode 21 is on, an on-signal is applied to the gate of the switching element 19. In holding this state, the direction of a resonance current of the transmitting coil 7 is reversed to turn off the diode 21 such that a current flows to the switching element 19. Then, the switching element 19 performs ZVS and ZCS turn-on.

In this embodiment, the switching elements 19 and 20 are alternately turned on and off with a dead time interval Td (e.g., 2 μs) not to short-circuit the inverter power supply 18. In FIG. 4F, T represents one period of a current flowing through the transmitting coil 7, and Ton represents the on-period of the switching element 19.

As such, the semiconductor switches included in the inverter circuit 4 according to this embodiment charges the associated snubber capacitors until the snubber capacitors have a voltage equal to the voltage at the inverter power supply 18 or discharge the snubber capacitors until the snubber capacitors have a voltage of zero, using the energy stored in the transmitting coil 7 to reduce the switching loss.

Specifically, in order to reduce the switching loss, as shown in FIG. 4A, the inverter circuit 4 needs to operate at, as a drive frequency, the lowest frequency within the range where energy $W_L$ in equation (1) is equal to or greater than energy $W_C$ in equation (2). The energy $W_L$ is charged in the transmitting coil 7 when the semiconductor switches are turned off and calculated using a current value Ia. The energy $W_C$ is needed to charge the snubber capacitors until the snubber capacitors have a voltage equal to the voltage Vinv at the inverter power supply 18 or discharge the snubber capacitors until the snubber capacitors have a voltage of zero.

$$W_L = L \cdot Ia^2/2 \qquad (1)$$

$$W_C = C \cdot Vinv^2/2 \qquad (2)$$

L represents the inductance of the transmitting coil 7. C represents the capacitance of the snubber capacitors 16 and 17.

Since loss $P_{loss}$ exists due to, for example, a resistance component R of a pattern on a substrate and a lead wire in practice, the energy $W_L$ in the equation (1) may have any value equal to or greater than the sum of the energy $W_C$ in the equation (2) and the loss $P_{loss}$ in the equation (3).

$$P_{loss} = R \cdot I^2 \qquad (3)$$

That is, the energy may have any value, as long as the snubber capacitors 16 and 17 are charged to have the voltage equal to the voltage Vinv or discharged to have the voltage of zero. The drive frequency at that time is defined as the lower limit drive frequencies (f1_limit-f3_limit).

Figure 5A:
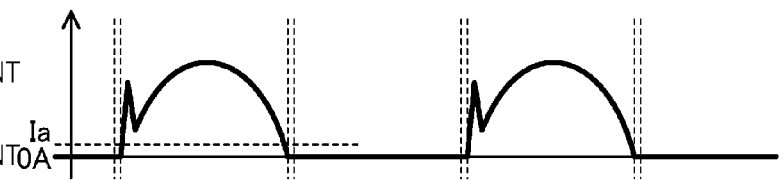
FIGS. 5A-5F illustrate operation waveforms of the inverter circuit shown in FIG. 2 with high loss.
Figure 5B:
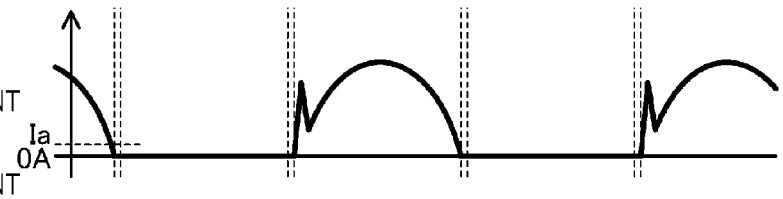
Figure 5C:
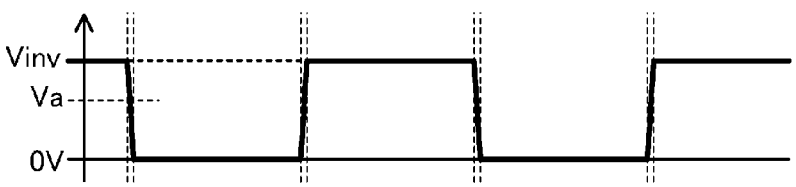
Figure 5D:
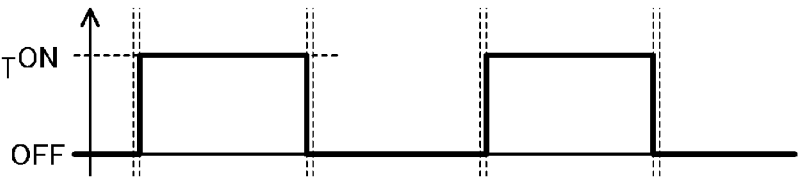
Figure 5E:
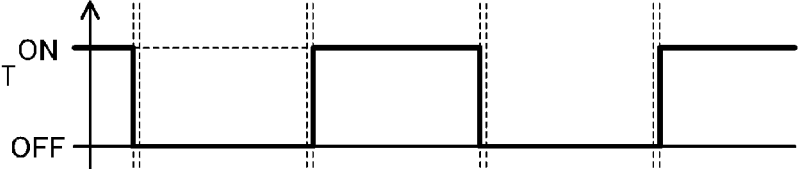
Figure 5F:
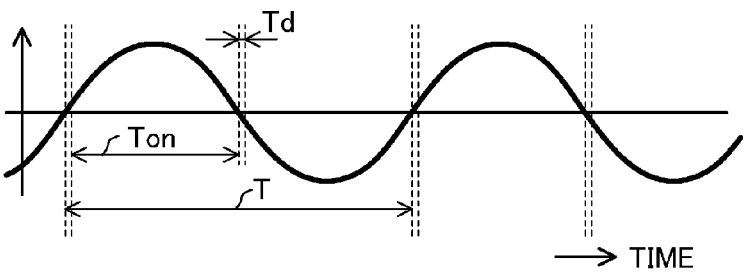
Figure 6A:
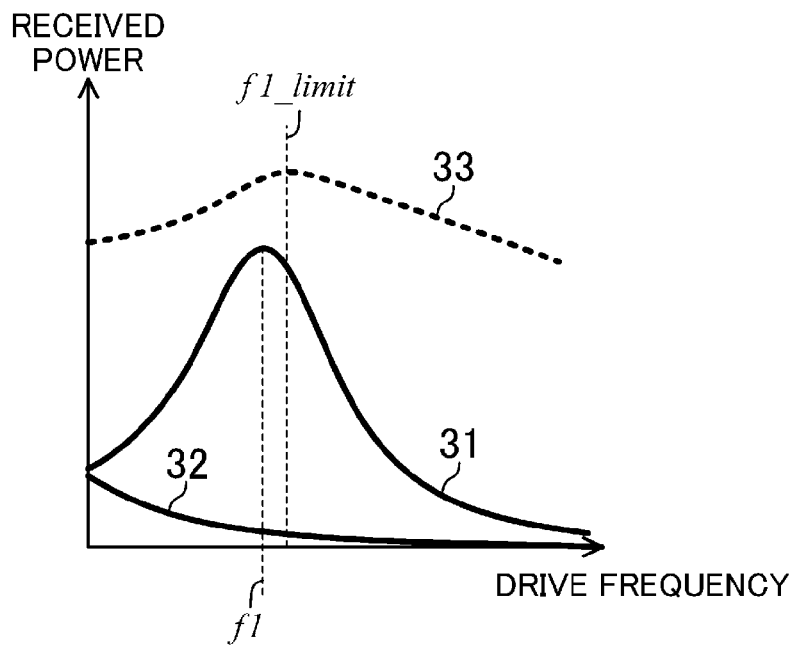
FIGS. 6A and 6B are enlarged views illustrating the frequency characteristic of the power received by the non-contact charger shown in FIG. 2.
Figure 6B:
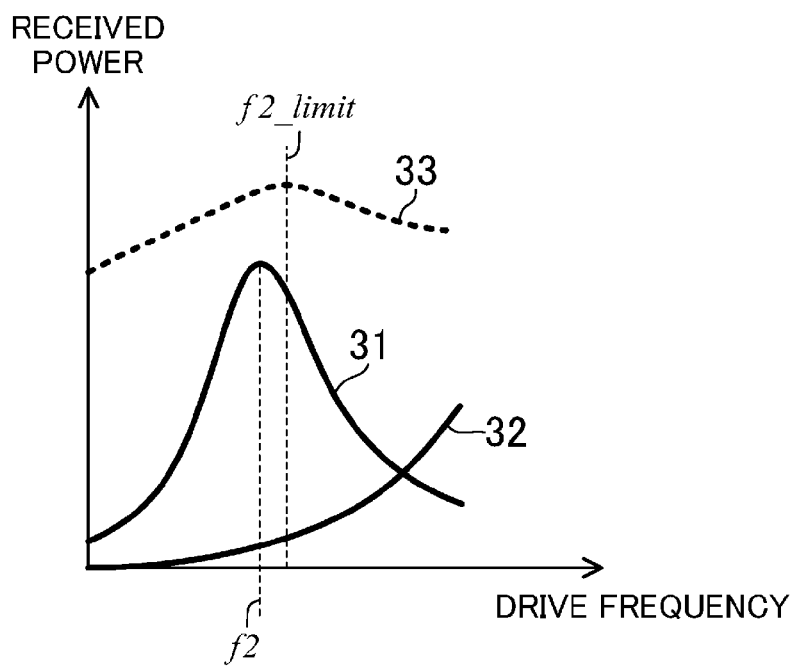

In this embodiment, when the inverter circuit 4 is driven at the maximum received power frequency f1 (that is, with high loss), operation waveforms of the inverter circuit 4 are shown in FIGS. 5A-5F. In this case, as shown in FIGS. 5A and 5B, the current value Ia is too small to meet the requirements that the energy $W_L$ in the equation (1) is equal to or greater than the energy $W_C$ in the equation (2). When one of the semiconductor switches is turned on, a short circuit current is applied to the semiconductor switch. The short circuit current flows from the inverter power supply 18 through the semiconductor switch and the snubber capacitor, or from the residual voltage Va of the snubber capacitor through the semiconductor switch. Thus, in such an operation mode, not only the loss at the semiconductor switches but also noise caused by a surge current largely increases. As a result, as shown in FIG. 6A, power transmission efficiency 33 is the maximum at the lower limit drive frequency f1_limit. According to the present disclosure, the inverter circuit 4 operates at the lower limit drive frequency not in the operation mode as shown in FIGS. 5A-5F, in which the loss and the noise largely increase. Then, the transmitted power is controlled while maintaining power transmission efficiency and noise decreases. FIG. 6B illustrates the power transmission efficiency 33 at the lower limit drive frequency f2_limit, and is the maximum at the lower limit drive frequency f2_limit.

The lower limit drive frequency may be determined by the following methods.

Figure 7:
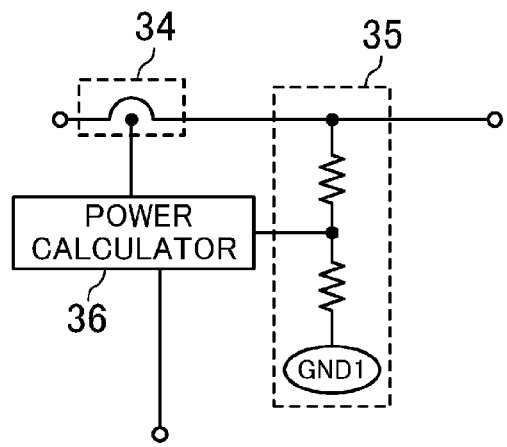
FIG. 7 is a circuit diagram illustrating a detailed example configuration of an input power detector, a received power detector, or a transmitted power detector shown in FIG. 2.

A first determination method using the transmitted power detector 30 will be described. As shown in FIG. 7, the transmitted power detector 30 according to this embodiment includes a current detector 34, a voltage detector 35, and a power calculator 36. The power calculator 36 multiplies a result of detection by the current detector 34 by a result of detection by the voltage detector 35 to calculate the average of the power.

At the time of turning off the semiconductor switches, the transmitted power control circuit 13 obtains the value detected by the current detector 34 (i.e., the current value Ia) to calculate the lower limit drive frequency from the energy $W_L$ using the equation (1). The transmitted power control circuit 13 also obtains the value detected by the voltage detector 35 (i.e., the voltage Vinv of the inverter power supply 18) to calculate the lower limit drive frequency using the equation (2).

A second method is, in the step of controlling the inverter circuit, to calculate the amount of change in the power received (i.e., the input electric power detected by the input power detector 5) before and after changing the drive frequency of the inverter circuit 4 (more specifically, controlling the drive frequency to be low). The lowest frequency in the range, in which the amount of change is equal to or larger than a predetermined value, is determined as the lower limit drive frequency.

As shown in FIGS. 3A and 3B, the lower limit drive frequency is determined utilizing the fact that the amount of change in the received power decreases relative to the amount of change in the drive frequency at the lower limit drive frequency. Instead of the amount of change in the received power, the lower limit drive frequency may be determined based on the amount of change in the transmitted power.

Even if the drive frequency is high, a small amount of received power changes. Thus, the lower limit drive frequency is properly determined by adding the conditions that the received power is equal to or greater than a predetermined value α, and that the amount of change in the received power is equal to or greater than a predetermined value β.

As shown in FIG. 3B, the predetermined value β represents a slope, which gradually decreases toward the lower limit operation frequency f1_limit near the resonance point. Thus, if it is detected that the slope β is equal to or smaller than a predetermined slope (i.e., the slope β is substantially horizontal), the f1_limit is detectable.

A third method is, in the step of controlling the inverter circuit, to calculate power transmission efficiency based on a result of detection by the input power detector 5 and a result of detection by the received power detector 10. Then, the frequency at which the power transmission efficiency is the maximum is determined as the lower limit drive frequency.

As shown in FIG. 7, the input power detector 5 includes the current detector 34, the voltage detector 35, and the power calculator 36. The current detector 34 detects the current flowing through the buck-boost converter 15. The voltage detector 35 detects the voltage output from the rectifier circuit 2. The power calculator 36 multiplies the result of detection by the current detector 34 by the result of detection by the voltage detector 35 to calculate the average of the power. The received power detector 10 also has the configuration shown in FIG. 7.

The lower limit drive frequency may be determined by any one or a combination of multiple ones of the methods as described above.

As shown in FIG. 7, each of the input power detector 5, transmitted power detector 30, and received power detector 10 according to this embodiment includes the current detector 34, the voltage detector 35, and the power calculator 36. However, if the power is assumed based on one of the current and the voltage, only one of the current detector 34 and the voltage detector 35 may be provided.

Figure 8:
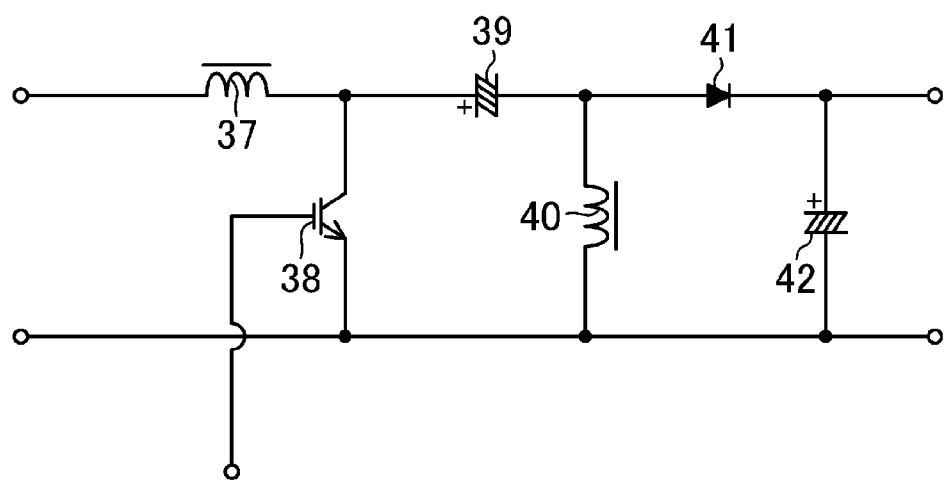
FIG. 8 is a circuit diagram illustrating a detailed example configuration of a buck-boost converter shown in FIG. 2.

FIG. 8 illustrates the configuration of the buck-boost converter 15 according to this embodiment. As shown in FIG. 8, the buck-boost converter 15 includes a choke coil 37, a semiconductor switch 38, an electrolytic capacitor 39, a choke coil 40, a diode 41, and an electrolytic capacitor 42.

The inverter power supply 18 may be shared to exclude the electrolytic capacitor 42. If the on-time of the semiconductor switch 38 is set long, the voltage output from the buck-boost converter 15 increases. If the on-time of the semiconductor switch 38 is set short, the voltage output from the buck-boost converter 15 decreases to be smaller than the voltage output from the rectifier circuit 2.

As described above, the transmitted power control circuit 13 adjusts the on-time of the semiconductor switch 38 so that the received power is equal to the power required for charging.

The received power control circuit 14 includes a transmitter transmitting necessary information, while the transmitted power control circuit 13 includes a receiver receiving the information transmitted from the received power control circuit 14. Signals with the frequency different from that of the inverter circuit 4 may be superimposed in the transmitting and receiving coils 7 and 8 so that the transmitting and receiving coils 7 and 8 communicate with each other. This case does not require any transmitter in the received power control circuit 14 and any receiver in the transmitted power control circuit 13, thereby reducing the size and weight of the non-contact charger.

Second Embodiment

Figure 9:
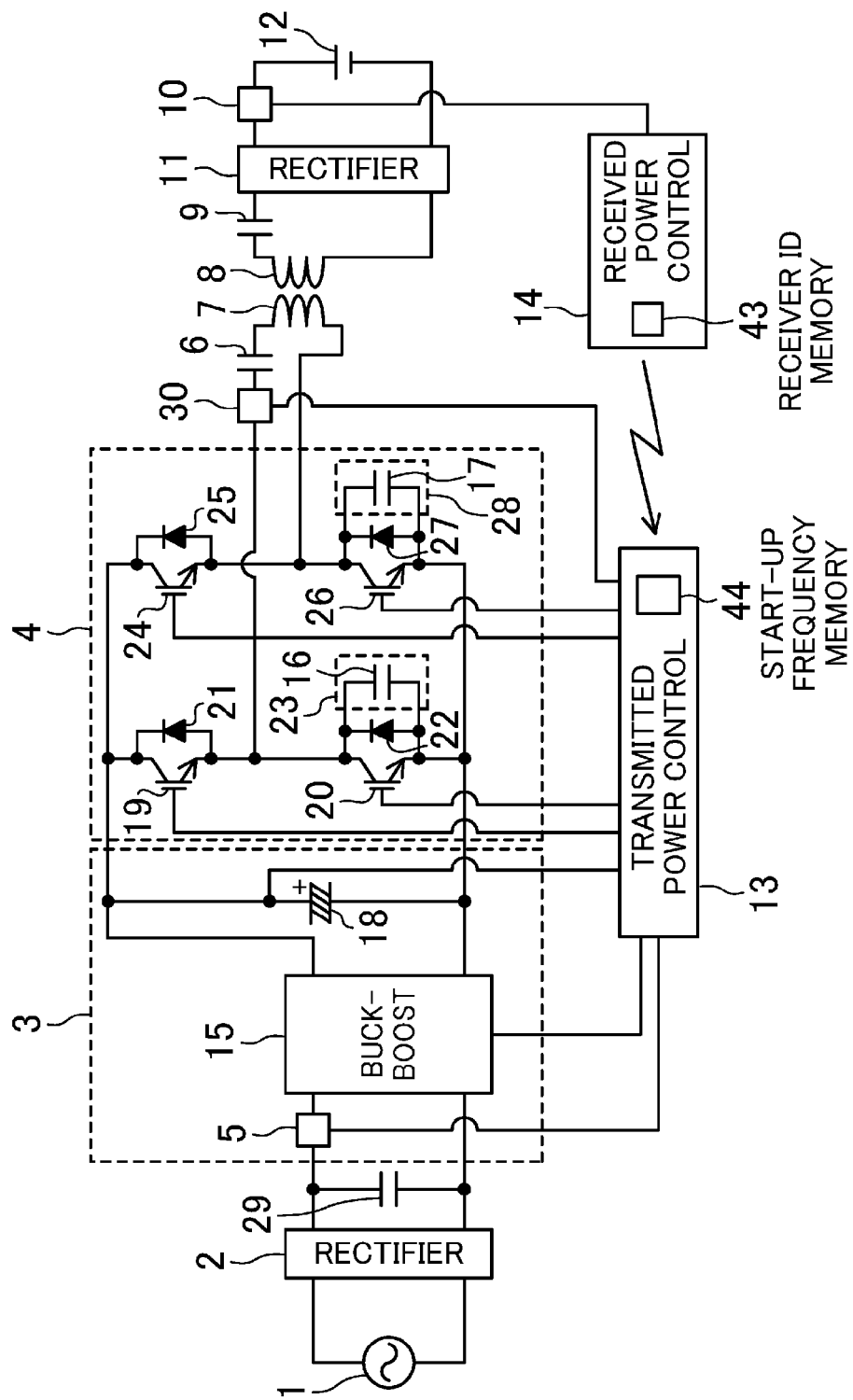
FIG. 9 is a circuit diagram of a non-contact charger according to a second embodiment of the present disclosure.

A non-contact charger according to a second embodiment of the present disclosure includes, as shown in FIG. 9, a receiver ID memory 43 in a received power control circuit 14, and a start-up frequency memory 44 in a transmitted power control circuit 13.

At the start of charging, the received power control circuit 14 transmits information needed for charging and receiver ID to the transmitted power control circuit 13. Upon receipt of the necessary information, the transmitted power control circuit 13 associates the voltage of the battery included in the information and the start-up frequency of an inverter circuit 4 with the receiver ID, and stores them in the start-up frequency memory 44. The transmitted power control circuit 13 selects the start-up frequency of the inverter circuit 4 based on the correspondence among the receiver ID, the voltage of the battery, and the start-up frequency of the inverter circuit 4.

Operation of selecting the start-up frequency in the non-contact charger according to the present disclosure will now be described in detail.

Once a receiving coil 8 attached to an electric propulsion vehicle substantially faces the transmitting coil 7, the received power control circuit 14 transmits the information needed for charging (e.g., the power required for charging, the voltage of the battery, and the receiver ID) to the transmitted power control circuit 13. Upon receipt of the information, the transmitted power control circuit 13 drives a buck-boost converter 15 and the inverter circuit 4 (starts up the buck-boost converter 15 prior to the inverter circuit 4) to transmit the power required for charging.

The buck-boost converter 15 steps up or down a voltage output from the rectifier circuit 2, and outputs the voltage to an inverter power supply 18. In a step of controlling startup at the start of charging, the buck-boost converter 15 outputs a voltage lower than the voltage output from a commercial power supply 1 to the inverter power supply 18 to set the inverter circuit 4 to transmit sufficiently low power at the startup. That is, the voltage at the inverter power supply 18 is set to be lower than the voltage output from the commercial power supply 1. Specifically, the power to be transmitted is suitably adjusted to be equal to or lower than about 100 W.

In a step of controlling the inverter, the transmitted power control circuit 13 selects the start-up frequency of the inverter circuit 4, which is suited for the receiver ID and the voltage of the battery, from the start-up frequency memory 44 included in the transmitted power control circuit 13. After that, the drive frequency is reduced to the lower limit drive frequency based on a predetermined period and the amount of control.

Figure 10A:
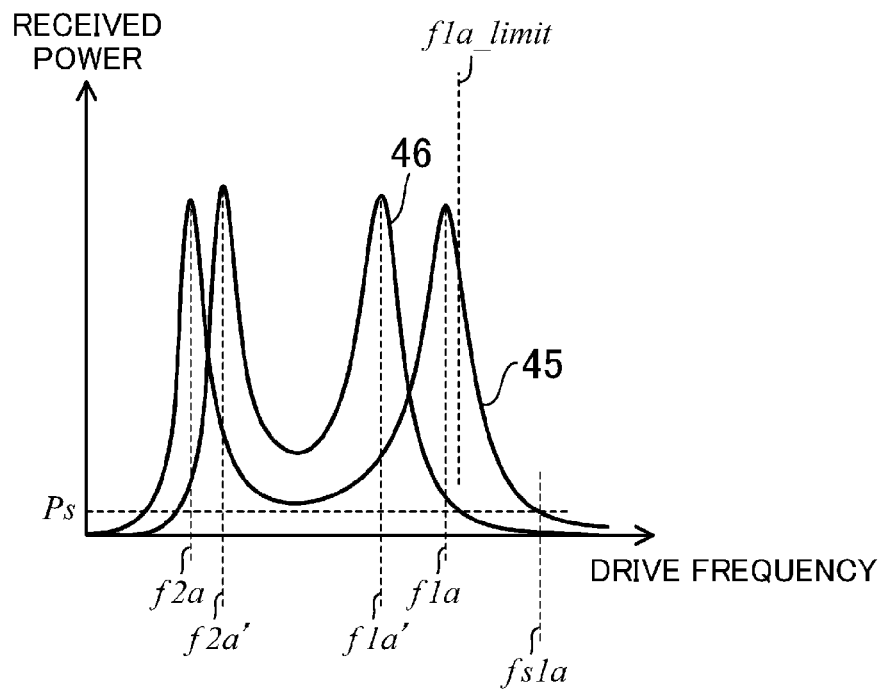
FIGS. 10A and 10B illustrate the frequency characteristic of the power received by the non-contact charger shown in FIG. 9.
Figure 10B:
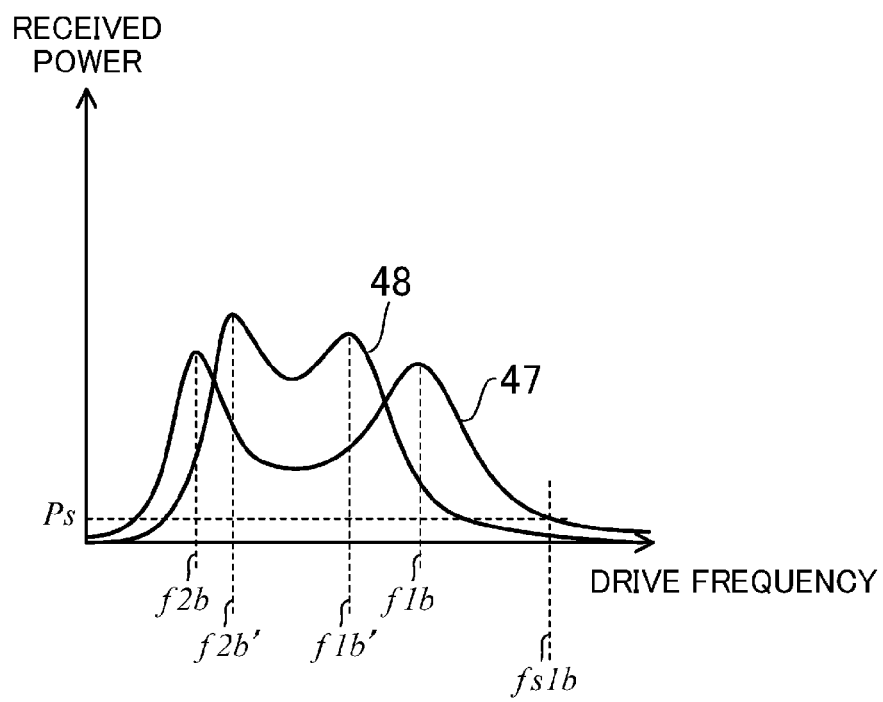

FIG. 10A illustrates the frequency characteristic of power received where the battery has a lower voltage, and where an air gap is small (see line 45) and large (see line 46). FIG. 10B illustrates the frequency characteristic of power received where the battery has a higher voltage, and where the air gap is small (see line 47) and large (see line 48).

In this embodiment, the relation between f1$a$ and f1$b$ is represented by f1$a$>f1$b$. As shown in FIGS. 10A and 10B, the maximum received power frequencies change depending on the air gap and the voltage of the battery. The line 45 will be described as an example. The start-up frequency fs1$a$, at which the power Ps received at the start-up has a value equal to or smaller than a predetermined value (e.g., Ps=100 W in this embodiment), is selected from the start-up frequency memory 44. After the start-up, the inverter circuit 4 reduces the drive frequency to the lower limit drive frequency f1$a$_limit.

Since the air gap changes depending on the load weight in a vehicle, it is not detectable from a non-contact charger. However, if the charger with a large air gap (see line 46) starts at the start-up frequency fs1$a$, which is the frequency where the air gap is small (see line 45), the received power is equal to or smaller than Ps, which is not a problem.

FIG. 11 illustrates what is stored in the start-up frequency memory 44. As shown in FIG. 11, the start-up frequency memory 44 stores the start-up frequency associated with the receiver ID and the voltage of the battery. For example, where the receiver ID is equal to one and the voltage of the battery is equal to 100 V (low), the start-up frequency fs1$a$ is selected. Therefore, the start-up frequency is also variable depending on the voltage of the battery. As a result, the present disclosure allows for addressing a change in the characteristics of the battery due to aging deterioration.

A sensor detecting an air gap may be mounted so that the start-up frequency memory 44 stores the receiver ID, the voltage of the battery, and the start-up frequency associated with the air gap. This case allows for reducing time to reach the lower limit drive frequency.

Once the drive frequency reaches f1$a$_limit, the process proceeds to a step of controlling the buck-boost converter. The transmitted power control circuit 13 gradually increases the voltage at the inverter power supply 18 to be high based on a predetermined period and the amount of control. The transmitted power control circuit 13 controls the buck-boost converter 15 such that a result of detection by the received power detector 10 is equal to the power required for charging.

As described in this embodiment, the transmitted power control circuit 13 selects the start-up frequency of the inverter circuit 4 based on the receiver ID and the voltage of the battery, thereby reducing time to reach the maximum received power frequency. The power received (or transmitted) at unstable start-up is reliably reduced to start up the charger not to damage the inverter circuit 4 and the buck-boost converter 15, for example.

If receiver ID is not stored in the start-up frequency memory 44, the transmitted power control circuit 13 confirms the operator whether or not to perform charging. If the operator selects to charge, the charger operates in a step of determining a start-up frequency.

In the step of determining a start-up frequency, the transmitted power control circuit 13 starts up the inverter circuit 4 at a predetermined frequency. After the start-up of the inverter circuit 4, the transmitted power control circuit 13 sets the frequency to be low based on a predetermined period and an interval (or the amount of control). The transmitted power control circuit 13 stores the frequency, which has reached the received power Ps (about 100 W in this embodiment) at the start-up, in the start-up frequency memory 44.

As such, the receiver ID is added to the start-up frequency memory 44 to store the receiver ID, the voltage of the battery, and the start-up frequency in association with each other. As a result, the charger is applicable to various vehicles with improved convenience.

In the step of determining a start-up frequency, the start-up frequency needs to be determined based on the air gap and the voltage of the battery, with which the received power Ps has the highest drive frequency within a guaranteed operational range of this system.

Once the received power of Ps or greater is detected when the inverter circuit 4 starts at a start-up frequency stored in the start-up frequency memory 44, the transmitted power control circuit 13 operates in the step of determining a start-up frequency to selects the start-up frequency again. This configuration allows us to avoid overpower at the start-up of the inverter circuit 4 to prevent damages of the circuits.

The non-contact charger according to the present disclosure is applicable to a non-contact charging system for, for example, an electric vehicle. In a non-contact charger not for an electric vehicle, which includes a pair of transmitting and receiving coils, the method of control according to the present disclosure is applied to an inverter circuit to obtain the same or similar advantages.

What is claimed is:

1. A non-contact charger comprising:
a transmitting coil;
an inverter circuit outputting power to be transmitted to the transmitting coil;
a receiving coil receiving the power as received power from the transmitting coil;
a transmitted power control circuit driving the inverter circuit at a frequency higher than maximum received power frequencies at which the received power has one or two maximum values, and
an inverter power supply connected to an input terminal of the inverter circuit,
wherein the inverter circuit includes:
a semiconductor switch, and
a snubber circuit including a snubber capacitor connected in parallel to the semiconductor switch, and
in turning off the semiconductor switch, the transmitted power control circuit drives the inverter circuit at a lower limit drive frequency at which the snubber capacitor is charged to have a voltage equal to a voltage of the inverter power supply or discharged to have a voltage of zero.

2. The non-contact charger of claim 1, further comprising:
a buck-boost converter outputting a certain voltage to the inverter power supply, wherein
the transmitted power control circuit drives the inverter circuit at the lower limit drive frequency, and increases or decreases the voltage output from the buck-boost converter to control the power to be transmitted.

3. The non-contact charger of claim 2, wherein the transmitted power control circuit sets a voltage at the inverter power supply to be lower than a voltage supplied from a commercial power supply.

4. The non-contact charger of claim 3, wherein the transmitted power control circuit reduces a drive frequency of the inverter circuit to the lower limit drive frequency based on a predetermined period and an amount of control, where the voltage at the inverter power supply is lower than the voltage supplied from the commercial power supply.

5. The non-contact charger of claim 2, further comprising:
an input power detector connected between a commercial power supply and the buck-boost converter;
a rectifier circuit rectifying power received by the receiving coil; and
a received power detector connected to an output terminal of the rectifier circuit, wherein
the lower limit drive frequency is a frequency at which power transmission efficiency calculated by a result of detection by the input power detector and a result of detection by the received power detector is maximized.

6. The non-contact charger of claim 1, wherein the lower limit drive frequency is a lowest frequency within a range in which energy stored in the transmitting coil, which is calculated by a current value when the semiconductor switch is turned off, is equal to or greater than energy charging the snubber capacitor to have a voltage equal to the voltage at the inverter power supply or discharging the snubber capacitor to have a voltage of zero.

7. The non-contact charger of claim 2, further comprising
an input power detector connected between a commercial power supply and the buck-boost converter, wherein
the lower limit drive frequency is a lowest frequency within a range in which an amount of change in input electric power detected by the input power detector before and after changing a drive frequency of the inverter circuit is equal to or greater than a predetermined value.

8. The non-contact charger of claim 1, wherein the transmitted power control circuit selects a start-up frequency of the inverter circuit based on a receiver ID and a voltage of a battery.

9. A non-contact charging method comprising:
outputting power to be transmitted from an inverter circuit to a transmitting coil, the inverter circuit including a semiconductor switch, and a snubber circuit including a snubber capacitor connected in parallel to the semiconductor switch; and
driving the inverter circuit at a frequency higher than maximum received power frequencies at which received power has one or two maximum values, and in turning off the semiconductor switch, driving the inverter circuit at a lower limit drive frequency at which the snubber capacitor is charged to have a voltage equal to a voltage of the inverter power supply or discharged to have a voltage of zero.

* * * * *